3,480,692
MIXTURES OF TRIGLYCIDYL ISOCYANURATE AND OTHER HETEROCYCLIC EPOXIDES
Hans Batzer, Arlesheim, and Daniel Porret, Binningen, Switzerland, assignors to Ciba Limited, Basel, Switzerland, a company of Switzerland
No Drawing. Filed Nov. 7, 1967, Ser. No. 681,079
Claims priority, application Switzerland, Nov. 8, 1966, 16,095/66
Int. Cl. C08g 30/08, 45/00
U.S. Cl. 260—830                                     10 Claims

ABSTRACT OF THE DISCLOSURE

The invention relates to curable mixtures containing triazine-epoxy resins, characterized in that they contain
(a) triglycidylisocyanurate,
(b) a glycidyl compound different from (a), which contains at least one nitrogenous 5- or 6-membered heterocycle, and
(c) a curing agent for epoxy resins.

---

The use of triglycidylisocyanurate, which has a relatively high melting point, as casting, impregnating, laminating resins or as adhesives is known. More especially, the shaped materials obtained by curing triglycidylisocyanurate with a dicarboxylic acid anhydride are distinguished by high mechanical strength, excellent heat stability, good dielectric properties up to relatively high temperatures and in particular by their high resistance to leakage currents and to external atmospheric agencies.

The high-melting crystalline triglycidylisocyanurates have, however, serious shortcomings which make it very difficult to use them industrially. Thus, owing to the fact that triglycidylisocyanurate begins to melt only above 100° C., it can be cured practically only with dicarboxylic acid anhydride curing agents because amine curing agents react much too violently at the necessary temperatures and lead to defective castings. Since it is another disadvantage of triglycidylisocyanurate that its solubility is very poor, it is impossible to prepare and cause to gel a homogeneous casting resin composition at a lower temperature. Furthermore, its extensive incompatibility with other epoxy resins precludes the formulation of resin compositions for special uses that are homogeneous at room temperature, and which otherwise if desired could be cured with polyamines. The high melting point, in conjunction with the high reactivity of triglycidylisocyanurate, makes the processing times so short that this otherwise valuable epoxy resin cannot be used for most industrial applications.

According to the present invention the difficulties of processing the resin are overcome by preparing a mixture of triglycidylisocyanurate with one or several other nitrogenous heterocyclic epoxy compounds before adding the curing agent. Surprisingly, this procedure leads to liquid, easy-to-process, curable mixture of epoxy resins which, moreover, give rise to shaped structures having improved or at least equally good mechanical and electrical properties.

Accordingly, the present invention provides curable mixtures containing triazine-epoxy resins which are characterized in that they contain (a) triglycidylisocyanurate, (b) a glycidyl compound different from (a), which contains at least one nitrogenous 5- or 6-membered heterocycle, preferably such a diglycidyl or triglycidyl compound comprising a nitrogenous heterocycle, and (c) a curing agent for epoxy resins.

As component (b) there are suitable monoglycidyl and polyglycidyl compounds having the defined chemical constitution. As monoglycidyl compound there may be mentioned, for example, N(3)-monoglycidyl-5,5-dimethyl-hydantoin.

The following compounds have proved particularly suitable for use as preferred diglycidyl or triglycidyl compounds (b):

(I)

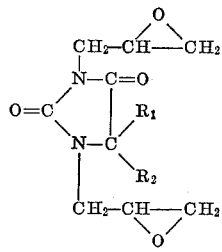

Ia ($R_1=R_2=H$): N,N'-diglycidyl-hydantoin
Ib ($R_1=CH_3$—; $R_2=H$): N,N'-diglycidyl-5-methyl-hydantoin
Ic ($R_1=R_2=CH_3$—): N,N'-diglycidyl-5,5-dimethyl-hydantoin (II)

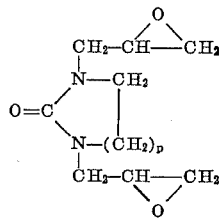

IIa (p=1): N,N'-diglycidyl-ethylene urea
IIb (p=2): N,N'-diglycidyl-propylene urea (III)

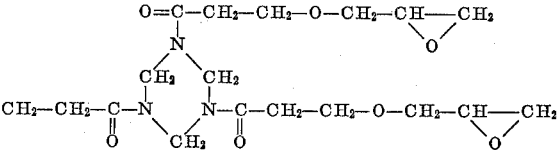

III: N,N',N"-tri-(3-glycidyloxypropionyl)hexahydro-s-triazine (IV)

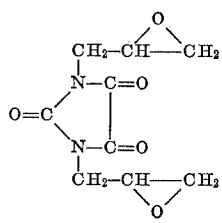

IV: N,N'-diglycidyl-parabanic acid (V)

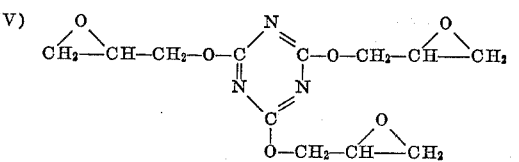

V: triglycidylcyanurate.

Preferred polyepoxy compounds (b) are those in which the glycidyl group is bound with a nitrogen atom of the heterocycle, either directly or via an oxygenous groups, as for example the compounds of Formulae I to IV.

It is also possible to use polyepoxy compounds (b) containing more than one nitrogenous 5- or 6-membered heterocycle, for example N,N'-diglycidyl(hydantoinyl-1)-methane such as N,N' - diglycidyl - bis(5,5 - dimethylhydantoinyl-1)methane or N,N' - diglycidyl(hydantoinyl-3)alkanes such as 1,2 - bis(N - glycidyl - 5',5' - dimethylhydantoinyl - 3')ethane or $\beta,\beta'$ - bis(N - glycidyl - 5,5-dimethylhydantoinyl-3)-diethyl ether.

The curable mixtures of this invention can be prepared by simply mixing the ingredients (a), (b) and (c) with heating. Preferably, a mixture $(a)+(b)$ is first prepared and the curing agent is added to it last.

A mixture of the ingredients (a) and (b), without the curing agent, can be advantageously stored as a so-called two-package system. Such a two-package system makes it possible to keep even cold-curing systems storable.

The mixture of the glycidyl compounds (a) and (b) can be prepared (1) by mechanical mixing or (2) by heating them together at least until a homogeneous melt has formed or (3) in situ, by common glycidylation of the nitrogenous heterocyclic starting materials to form the glycidyl compounds (a) and (b).

As a rule, the resulting mixtures are liquid at room temperature; sometimes, it may be necessary to heat the mixture for a short time to liquefy it. Crystallization only sets in some time later so that it becomes possible to obtain even at a lower temperature a liquid resin+curing agent mixture having an adequate pot life. When in the manufacture by method (1) the mixture is heated for a prolonged period, the tendency to crystallize is reduced.

The common glycidylation of the nitrogenous starting materials containing 5- or 6-membered heterocycles to form the glycidyl compounds (a) and (b) is carried out in known manner, in the presence of epichlorohydrin, under conditions such that the glycidylation takes place on the NH-groups of the individual heterocyclic starting materials (for example according to the process disclosed in German specifications 1,180,372 and 1,211,650) and that the starting materials are completely glycidylated.

When the curable mixtures of this invention, consisting of the ingredients (a) and (b) and the curing agents (c), are cured, there are obtained cured epoxy resins which are distinguished by high mechanical strength properties, excellent heat stability, low dielectric losses at elevated temperatures or improved flexibility.

Since the mixtures of the glycidyl compounds (a) and (b) are as a rule liquid at room temperature, they offer the further advantage over pure triglycidylisocyanurate that they can be cured also in the cold, especially with aliphatic or cycloaliphatic polyamines such as ethylenediamine, N,N-diethylethylenediamine, diethylenetriamine, tetra(hydroxyethyl) - diethylenetriamine, triethylenetetramine, N,N - dimethylpropylenediamine and in particular with 3,5,5 - trimethyl - 3 - (aminomethyl) - cyclohexylamine, 2,2,4- or 2,4,4 - trimethylhexamethylenediamine, bis(4 - aminocyclohexyl) - methane or 2,2-bis(4'-aminocyclohexyl)propane. By virtue of the high reactivity it is possible to cure them even at temperatures of about 0° C. within 2 hours.

As curing agent component (c) there may be further used, for example, aromatic polyamines, for instance p-phenylenediamine, benzidine, bis(p - aminophenyl)methane or 2,2 - bis(p - aminophenyl)propane, Mannich's bases such as 2,4,6 - tris(dimethylaminomethyl)phenol; dicyandiamide, urea-formaldehyde resins, melamine-formaldehyde resins, polyamides, for example those from aliphatic polyamines and dimerized or trimerized unsaturated fatty acids; polyhydric phenols, for example resorcinol, bis(4 - hydroxyphenyl)dimethylmethane; phenolformaldehyde resins; reaction produtcs of aluminium alcoholates or phenolates with compounds of tautomeric reaction of the acetoacetic ester type; Friedel-Crafts catalysts, for example $AlCl_3$, $SbCl_5$, $SnCl_4$, $ZnCl_2$, $BF_3$ and their complexes with organic compounds, for instance $BF_3$-amine complexes, metal fluoroborates such as zinc fluoroborates; phosphoric acid; boroxines such as trimethoxyboroxine.

Preferred curing agents are polybasic carboxylic acids and their anhydrides, for example phthalic anhydride, pyromelitic dianhydride and especially aliphatic or cycloaliphatic polycarboxylic acid anhydrides such as tetrahydrophthalic, hexahydrophthalic, methylhexahydrophthalic, endomethylene - tetrahydrophthalic, methyl - endomethylene - tetrahydrophthalic anhydride (=methyl nadic anhydride), hexachloro - endomethylene - tetrahydrophthalic, succinic, adipic, azelaic, maleic, allylsuccinic, dodecenylsuccinic anhydride; 7-allyl - bicyclo(2,2,1)-hept - 5-ene - 2,3 - dicarboxylic acid anhydride, or mixtures of such anhydrides. Preferred curing agents are those which are liquid at room temperature and/or are compatible with the mixture of the ingredients (a) and (b).

If desired, an accelerator, such as a teritiary amine or a salt or quaternary ammonium compound thereof, for example 2,4,6 - tris(dimethylaminomethyl)phenol, benzyldimethylamine or benzyldimethyl ammonium phenolate, tin(II) salts of carboxylic acids such as tin(II) actoate or alkali metal alcoholates, for example sodium hexylate, may be further incorporated. However, as a rule the use of such an accelerator is not needed in view of the high reactivity of the epoxides used.

The curing of the instant epoxide mixtures with anhydrides is advantageously carried out with the use of 0.1 to 1.5, preferably 0.3 to 1.2 gram equivalents of anhydride groups for every gram equivalent of epoxide groups.

The term "curing" as used in this context refers to the conversion of the above-mentioned mixture of the glycidyl compounds (a) and (b) and a curing agent (c) into insoluble and infusible, cross-linked products, generally with simultaneous shaping to furnish shaped articles such as castings, mouldings or laminates or two-dimensional structures such as coatings, lacquer films or adhesive bonds.

If desired, the curing may be performed in two stages by interrupting the curing reaction prematurely so that a still fusible and soluble, curable precondensate (the so-called "B-stage") is obtained from the epoxide components (a) and (b) and the curing agent (c), which is preferably an anhydride curing agent. When the curing agent is suitably selected, such a procondensate has a more or less restricted pot life and may be used, for example, for the manufacture of "prepregs," moulding compositions or sinter powder.

Furthermore, the curable mixtures of this invention may be admixed at any stage before the curing operation with fillers, plasticizers, pigments, dyestuffs, flame-proofing agents and/or mould release agents.

Suitable extenders and fillers are, for example, asphalt, coal tars, bitumen, glass fibres, boron fibres, carbon fibers, polyethylene powder, cellulose, mica, quartz meal, slate powder, aluminium oxide hydrate, gypsum, kaolin, ground dolomite, finely disperse silica having a large specific surface (registered trademark Aerosil) or metal powders such as silver powder or aluminium powder.

The unfilled or filled curable mixtures may be used, if desired in the form of solutions or emulsions, as textile finishes, coating compositions, laminating resins, paints, lacquers, dipping and casting resins, moulding compositions, grouting and sealing compositions, floorings, potting and encapsulating compositions for insulating purposes in the electrical industry, adhesives and for the manufacture of such formulated products.

The curable mixtures of this invention containing triglycidylisocyanurate are especially suitable as moulding compositions.

Percentages in the following examples are by weight.

Example 1

(a) A mixture of 100 g. of triglycidylisocyanurate (containing 9.84 gram equivalents of epoxide groups per kg.) and 100 g. of N,N'-diglycidyl-5,5-dimethylhydantoin (containing 7.49 epoxide equivalents per kg.) is heated to 180° C. and thoroughly stirred. After 15 minutes this mixture A is cooled to room temperature. Mixture A is liquid at room temperature and begins to crystallize only after 1 day.

(b) 100 grams of mixture A and 125 g. of hexahydrophthalic anhydride are heated to 60° C., thoroughly stirred, deaerated under vacuum to remove air bubbles and poured into moulds preheated at 80° C. The resin+curing agent mixture was cured for 16 hours at 140° C. The resulting castings revealed the following properties:

Flexural strength (VSM 77 103) _____kg./mm.$^2$__ 12.7
Deflection (VSM 77 103) _____mm__ 7.4
Impact strength (VSM 77 05) _____cmkg./cm.$^2$__ 12.5
Water absorption, 4 days at 20° C. _____percent__ 0.43
1%-value of the dielectric loss factor tgδ ____° C__ 140
3%-value of the dielectric loss factor tgδ ____° C__ 155

For comparison the following experiment was performed using triglycidylisocyanurate alone as epoxy resin component:

100 grams of triglycidylisocyanurate were heated to 180° C. until a clear melt had formed which was cooled to 150° C. and 128 g. of hexahydrophthalic anhydride, maintained at a temperature of 50° C., were added. The mixture was deaerated under vacuum and rapidly poured into a mould preheated at 80° C. The processing time was only a few minutes. After having been cured for 16 hours at 140° C., the castings revealed the following properties:

Flexural strength (VSM 77 103) _____kg./mm.$^2$__ 9.0
Deflection (VSM 77 103) _____mm__ 4.8
Impact strength (VSM 77 105) _____cmkg./cm.$^2$__ 9.3
Water absorption, 4 days at 20° C. _____percent__ 0.52
1%-value of the dielectric loss factor tgδ ____° C__ 155

Example 2

(a) A mixture of 100 g. of triglycidylisocyanurate (containing 9.84 epoxide equivalents per kg.) and 100 g. of N,N'-diglycidylethylene urea (containing 7.2 epoxide equivalents per kg.) was heated to 180° C. and thoroughly stirred. After 15 minutes this mixture B was cooled to room temperature. Mixture B remains liquid, without crystallizing, for at least 48 hours.

(b) 100 grams of mixture B and 123 g. of hexahydrophthalic anhydride were heated to 60° C., thoroughly mixed, deaerated under vacuum and poured into moulds preheated at 80° C. After having been cured for 16 hours at 140° C. the resulting castings revealed the following properties:

Flexural strength (VSM 77 103) _____kg./mm.$^2$__ 12.2
Deflection (VSM 77 103) _____mm__ 7.3
Impact strength (VSM 77 105) _____cmkg./cm.$^2$__ 8.5
Water absorption, 4 days at 20° C. _____percent__ 0.50
1%-value of the dielectric loss factor tgδ ____° C__ 170

Example 3

(a) A mixture of 25 g. of triglycidylisocyanurate (containing 9.84 epoxide equivalents per kg.) and 100 g. of N,N'-diglycidyl ethylene urea (containing 7.2 epoxide equivalents per kg.) was heated to 180° C. and thoroughly stirred. After 15 minutes this mixture C was cooled to room temperature. Mixture C is liquid at room temperature and does not crystallized within 8 hours.

(b) 100 grams of mixture C and 100 g. of hexahydrophthalic anhydride were heated to 60° C., thoroughly stirred, deaerated under vacuum and poured into moulds preheated at 80° C. The castings obtained after curing for 16 hours at 140° C. revealed the following properties:

Flexural strength (VSM 77 103) _____kg./mm.$^2$__ 11.1
Deflection (VSM 77 103) _____mm__ 4.5
Impact strength (VSM 77 105) _____cmkg./cm.$^2$__ 12.9
Water absorption, 4 days at 20° C. _____percent__ 0.38
1%-value of the dielectric loss factor tgδ ____° C__ 120

Example 4

(a) A mixture of 100 g. of triglycidylisocyanurate (containing 9.84 epoxide equivalents per kg.) and 11 g. of N,N'-diglycidyl-5,5-dimethylhydantoin (containing 7.49 epoxide equivalents per kg.) was heated to 180° C. and thoroughly stirred. After 5 minutes this mixture D was cooled to room temperature. Mixture D is at first liquid at room temperature.

(b) 100 grams of mixture D and 114 g. of hexahydrophthalic anhydride were heated to 60° C., thoroughly stirred, deaerated under vacuum and poured into moulds preheated at 80° C. After having been cured for 16 hours at 140° C., the resulting castings revealed the following properties:

Flexural strength (VSM 77 103) _____kg./mm.$^2$__ 11.6
Deflection (VSM 77 103) _____mm__ 4.3
Impact strength (VSM 77 105) ____cmkg./cm.$^2$__ 9.7
Water absorption, 4 days at 20° C. _____percent__ 0.33
1%-value of the dielectric loss factor tgδ ____° C__ 161
Dielectric constant ε between 20 and 160° C. _____ 3.8

Example 5

(a) A mixture of 100 g. of triglycidylisocyanurate (containing 9.84 epoxide equivalents per kg.) and 100 g. of N,N',N" - tri - (3 - glycidyloxypropionyl)hexahydro-s-triazine (containing 5.2 epoxide equivalents per kg.) was heated to 180° C. and thoroughly stirred. After 10 minutes this mixture E was cooled to room temperature. Mixture E is liquid at room temperature and does not begin to crystallize within 24 hours.

(b) 100 grams of mixture E and 109 g. of hexahydrophthalic anhydride were heated to 60° C., thoroughly stirred, deaerated under vacuum and poured into moulds preheated at 80° C. After curing for 16 hours at 140° C., castings are obtained having the following properties:

Flexural strength (VSM 77 103) _____kg./mm$^2$__ 16.0
Deflection (VSM 77 103) _____mm__ 9.7
Impact strength (VSM 77 105) _____cmkg./cm$^2$__ 15.7
Water absorption, 4 days at 20° C. _____percent__ 0.38
3%-value of the dielectric loss factor tgδ ____° C__ 115

Example 6

100 grams of mixture E of Example 5 together with 120 g. hexahydrophthalic anhydride were heated to 60° C., thoroughly stirred, deaerated under vacuum and poured into moulds preheated at 80° C. After curing for 16 hours at 140° C. castings were obtained which had the following properties:

Flexural strength (VSM 11 103) _____kg./mm$^2$__ 15.0
Deflection (VSM 77 103) _____mm__ 8.6
Water absorption, 4 days at 20° C. _____percent__ 0.35

Example 7

100 grams of mixture E of Example 5 together with 92 g. of hexahydrophthalic anhydride were heated to 60° C., thoroughly stirred, deaerated under vacuum and poured into moulds preheated at 80° C. The castings obtained after curing for 16 hours at 140° C. had the following properties:

Flexural strength (VSM 77 103) _____kg./mm$^2$__ 16.7
Deflection (VSM 77 103) _____mm__ 10.3
Impact strength (VSM 77 105) _____cmkg./cm$^2$__ 10.5
Water absorption, 4 days at 20° C. _____percent__ 0.41

Example 8

100 grams of mixture B of Example 2 were mixed with 15.3 g. of triethylenetetramine, poured into a mould and cooled to +1° C. The casting obtained after 2 hours at +1° C. was solid but brittle. After 24 hours at 20° C. the casting had turned hard and tough.

Example 9

100 grams of mixture B of Example 2 were heated at 40° C., then mixed with 49 g. of 2,2-bis(4'-aminocyclohexyl) propane, deaerated under vacuum and poured into moulds preheated at 60° C. After curing for 16 hours at 20° C. and then for 4 hours at 80° C., castings were obtained which had the following properties:

Flexural strength (VSM 77 103) _____kg./mm$^2$__ 7.7
Water absorption, 4 days at 20° C. _____percent__ 0.84

Example 10

(a) (Manufacturing a mixture of polyglycidyl ethers from cyanuric acid and ethylene urea in situ: Mixture F).

A mixture of 120 g. of ethylene urea (of 88% strength), 120, 4 g. of cyanuric acid, 3238 g. of epichlorohydrin and 2 g. of triethylamine was heated to the boil at 117° C., during which the solid substance dissolved within 30 minutes. After 3 hours, the mixture was cooled to 60° C. and within 30 minutes 254 g. of solid sodium hydroxide (of 97% purity) were added in portions, and the whole was then stirred for 40 minutes at 60° C., whereupon the water of reaction was removed by azeotropic distillation with epichlorohydrin under 50 mm. Hg pressure. The salt was then filtered off and washed with a small quantity of epichlorohydrin and then concentrated, at first under 50 mm. Hg vacuum to distil off the epichlorohydrin and then under a vacuum of 0.2 mm. Hg to remove the remaining volatile constituents. There were obtained 393.5 g. of a clear, brown, highly viscous resin (mixture F). The product contained 5.3 epoxide equivalents per kg. and 2.9% of chlorine.

(b) 100 grams of mixture F together with 95.3 g. of hexahydrophthalic anhydride were heated to 60° C., thoroughly stirred, deaerated under vacuum and poured into moulds preheated at 80° C. After curing for 16 hours at 140° C. castings were obtained which had the following properties.

Flexural strength (VSM 77 103) _____kg./mm$^2$__ 15.3
Deflection (VSM 77 103) _____mm__ 9.0
Impact strength (VSM 77 105) _____cmkg./cm$^2$__ 14.7
Water absorption, 4 days at 20° C. _____percent__ 0.36

Example 11

(a) (Manufacturing a mixture of the polyglycidyl ethers of 5,5-dimethylhydantoin and cyanuric acid in situ: Mixture G).

A mixture of 128 g. of 5,5-dimethylhydantoin, 128 g. of cyanuric acid, 2761 g. of epichlorohydrin and 2 g. of triethylamine was heated to the boil at 115° C., during which the solid substance dissolved after 20 minutes. After 3 hours the mixture was cooled to 60° C. and within 30 minutes 267 g. of solid sodium hydroxide (of 97% purity) were added in portions, and the whole was then stirred for 40 minutes at 60° C. Epichlorohydrin was then distilled off under 50 mm. Hg pressure until the water of reaction had been removed azeotropically. The salt was then filtered off and washed with a small quantity of epichlorohydrin. The product was then further concentrated, at first under a vacuum of 50 mm. Hg to distil off the epichlorohydrin and then under a vacuum of 0.2 mm. Hg to remove the remaining volatile constituents, to furnish 446 g. of a clear, yellow, highly viscous resin (mixture G). The product contained 6.46 epoxide equivalents per kg. and 3% of chlorine.

(b) 100 grams of mixture G (=reaction product from dimethylhydantoin, cyanuric acid and epichlorohydrin) were mixed with 84 g. of hexahydrophthalic anhydride and heated to 60° C., thoroughly stirred, deaerated under vacuum and poured into moulds preheated at 80° C. After curing for 16 hours at 140° C., castings were obtained which had the following property:

3%-value of the dielectric loss factor tgδ: 127° C.

Example 12

50 grams of triglycidylisocyanurate (containing 9.84 epoxide equivalents per kg.) were rapidly dissolved at 190° C. in 50 g. of β,β'-bis(N-glycidyl-5,5-dimethylhydantoinyl-3)-diethyl ether (containing 4.53 epoxide equivalents per kg.) and immediately cooled to 100° C. At this temperature 105 g. of hexahydrophthalic anhydride (corresponding to 0.95 equivalent of anhydride group per 1.0 equivalent of epoxide group) were added. The whole was thoroughly stirred, deaerated under vacuum for a short time and poured into preheated aluminium moulds (plates 3 mm. thick for electrical measurements and plates 4 mm. thick for mechanical measurements). After a heat treatment of 16 hours at 140° C. the plates were taken out of the moulds and the specimens needed for the mechanical tests carefully machined out of the plates. The resulting shaped specimens revealed the following properties:

Fexural strength (VSM 77 103) ____kg./mm.$^2$__ 10.2
Deflection (VSM 11 103) _____mm__ 4.1
Impact strength (VSM 77 105) __cmkg./cm.$^2$__ 6.3
Heat distortion characteristic (ISO R 75) __°C__ 164
Water absorption after 24 hours at 20° C.
 percent__ 0.25
Dielectric loss factor tgδ (VSM 77 107) at, °C.:
 24 _____ 0.0070
 110 _____ 0.0030
 152 _____ 0.010
Dielectric constant ε (VSM 77 108) at, °C.:
 24 _____ 3.6
 110 _____ 3.6
 152 _____ 3.7
Leakage current resistance (DIN 53 480): KA 3 c.

Example 13

50 grams of triglycidylisocyanurate (containing 9.84 epoxide equivalents per kg.) were rapidly dissolved at 190° C. in 50 g. of (N)3-monoglycidyl-5,5-dimethylhydantoin (containing 5.18 epoxide equivalents per kg.) and immediately cooled to 100° C. At this temperature 102 g. of hexahydrophthalic anhydride (corresponding to 0.95 equivalent of anhydride group for 1.0 equivalent of epoxide group) were added. The whole was thoroughly mixed and deaerated under vacuum for a short time and then, as described in Example 12, poured into preheated moulds and cured. The shaped specimens obtained as described in Example 12 revealed the following properties:

Flexural strength (VSM 77 103) ____kg./mm.$^2$__ 8.1
Deflection (VSM 77 103) _____mm__ 3.1
Heat distortion characteristic (ISO R 75) __°C__ 156
Water absorption after 24 hours at 20° C.
 percent__ 0.20
Dielectric loss factor tgδ (VSM 77 108) at, °C.:
 20 _____ 0.0070
 110 _____ 0.0050
 140 _____ 0.0160
Dielectric constant (VSM 77 108) at, °C.:
 24 _____ 3.4
 110 _____ 3.7
 140 _____ 3.8
Tracking resistance (DIN 53 480): KA 3 c.

What is claimed is:
1. A curable composition of matter comprising an epoxy resin mixture comprising:
 (a) triglycidyl-isocyanurate
 (b) a heterocyclic glycidyl compound selected from the group consisting of N-monoglycidyl-hydantoins, N,N'-diglycidyl-hydantoins, N,N' - diglycidyl-bis-hy- dantoins, N,N'-diglycidyl-ethylene urea, N,N'-diglycidyl-propylene urea, N,N',N"-tri(3-glycidyloxypropionyl)hexahydro-s-triazine N,N'-diglycidyl - parabanic acid and triglycidyl-cyanurate; and (c) a curing agent for said epoxy resins.

2. A curable composition as claimed in claim 1, which contains as ingredient (b) N,N'-diglycidyl-5,5-dimethylhydantoin.

3. A curable composition as claimed in claim 1, which contains as ingredient (b) N(3)-monoglycidyl, 5,5-dimethylhydantoin.

4. A curable composition as claimed in claim 1, which contains as ingredient (b) β,β'-bis(N-glycidyl-5,5-dimethyl-hydantoinyl-3)-diethyl ether.

5. A composition as claimed in claim 1, which contains as ingredient (b) N,N'-diglycidyl-hydantoin.

6. A composition as claimed in claim 1, which contains as ingredient (b) N,N'-diglycidyl-5-methyl-hydantoin.

7. A composition as claimed in claim 1, which contains as curing agent (c) a polycarboxylic acid anhydride.

8. A composition as claimed in claim 7, which contains as curing agent (c) hexahydrophthalic anhydride.

9. A composition as claimed in claim 1, which contains as curing agent (c) a member selected from the group consisting of aliphatic polyamines and cycloaliphatic polyamines.

10. A two-package curable resin system capable of curing to form a hard, insoluble and infusible resinous material, said curable system consisting essentially of first and second packages:

(1) in a first package an epoxy resin mixture comprising
 (a) triglycidyl-isocyanurate; and
 (b) a heterocyclic glycidyl compound selected from the group consisting of N-monoglycidyl-hydantoins, N,N'-diglycidyl-hydantoins, N,N'-diglycidyl - bis - hydantoins, N,N'-diglycidyl-ethylene urea, N,N'-diglycidyl - propylene urea, N,N',N" - tri(3 - glycidyloxypropionyl)hexahydro-s-triazine N,N'-diglycidyl - parabanic acid and triglycidyl-cyanurate;

(2) in a second package a curing agent for said epoxy resins.

References Cited
UNITED STATES PATENTS 3,351,673  11/1967  Price _____ 260—830
3,351,674  11/1967  Masters _____ 260—830

MURRAY TILLMAN, Primary Examiner

PAUL LIEBERMAN, Assistant Examiner

U.S. Cl. X.R.

260—2, 18, 37, 78.4, 831, 834, 836